June 2, 1931.  E. P. McMURTRY  1,807,999
UNIVERSALLY ADJUSTABLE TOOL HOLDER
Filed May 22, 1929  2 Sheets-Sheet 1
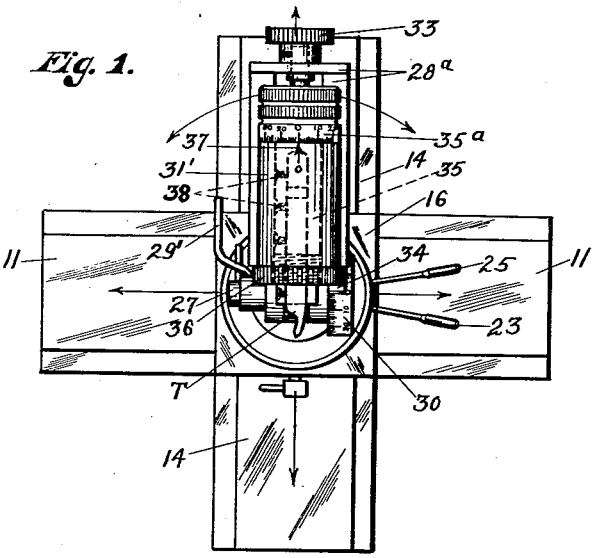
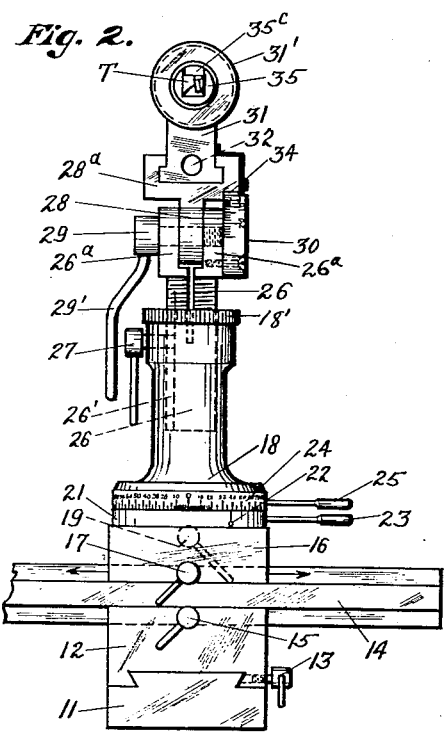
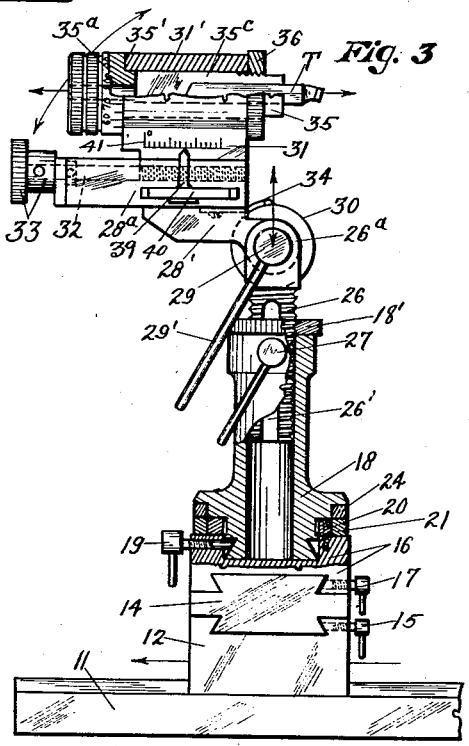
INVENTOR.
Edward P. McMurtry
BY
ATTORNEYS.

June 2, 1931.　　　E. P. McMURTRY　　　1,807,999
UNIVERSALLY ADJUSTABLE TOOL HOLDER
Filed May 22, 1929　　　2 Sheets-Sheet 2
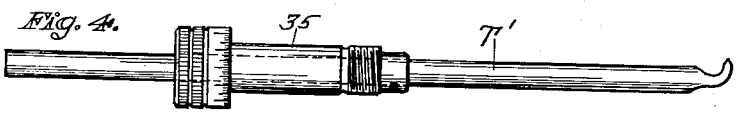
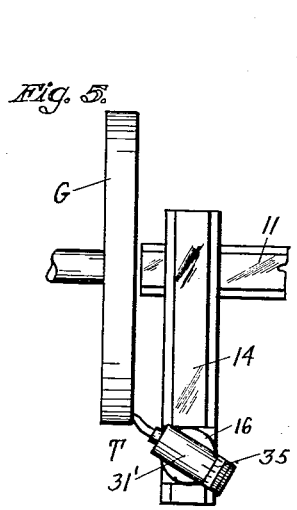
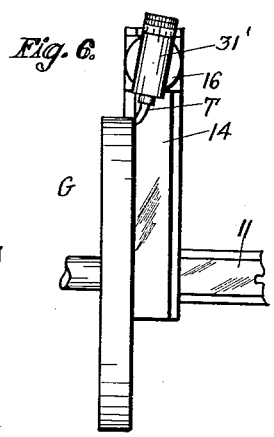
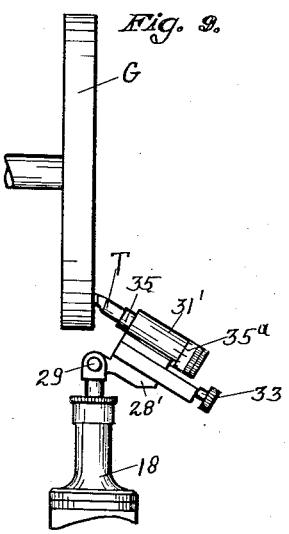
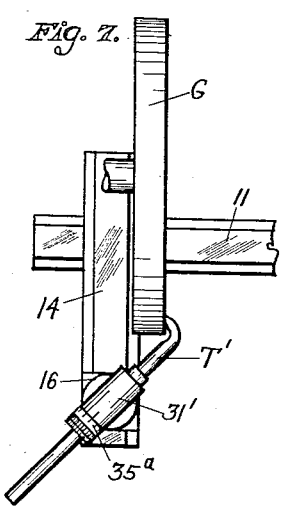
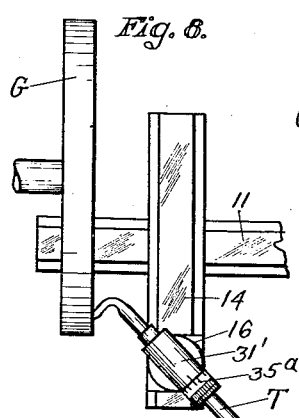
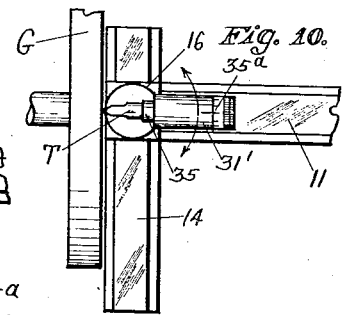

Patented June 2, 1931

1,807,999

UNITED STATES PATENT OFFICE

EDWARD P. McMURTRY, OF PASADENA, CALIFORNIA

UNIVERSALLY ADJUSTABLE TOOL HOLDER

Application filed May 22, 1929. Serial No. 365,221.

My invention relates to a universally adjustable tool holder, adapted for holding tools of various kinds for the sharpening or grinding operation and it has among its salient objects to provide an apparatus which is capable of a great variety of adjustments in order to accurately hold a tool at the particular angle relative to the grinding member, whereby the tool can be accurately and scientifically shaped and sharpened, said apparatus being adapted to adjustments which can be accurately determined and record made of the exact positions of the various parts which are adjustable in order to properly and nicely adjust the tool to the required position, thus making it possible to duplicate the adjustment from such a record at any time. In other words, I have provided an apparatus for holding tools and the like in any particular position and from which a formula can be made for future duplication, thus making it possible for unskilled labor to properly and accurately grind tools which require great accuracy as to the angle or form of the cutting edge.

I have shown on the accompanying sheet of drawings an apparatus embodying my invention and adapted for holding a tool to be ground, although I do not limit my invention to this specific use, realizing that it is susceptible to other uses, and can be embodied in machines for other purposes, without departing from the real spirit of the invention.

In order to explain my invention, however, I have shown the preferred form of embodiment in a tool holding apparatus. In the drawings Figure 1 is a plan view of a tool holder embodying my invention;

Figure 2 is a side elevation of the same;

Figure 3 is a side elevation, looking at Fig. 2 from the right side, with parts in section, to show interior construction and arrangement;

Figure 4 is a tool holding collet for holding tool with round shank or body;

Figures 5 and 6 are plan views of grinding wheel, showing two adjustments for grinding opposite faces of tool;

Figures 7 and 8 are similar views showing adjustments for grinding tool for internal cutting;

Figure 9 is a side elevation of a grinding wheel, showing another adjustment about a horizontal axis to secure another contact with the face of the wheel; and Figure 10 is a plan view, showing how the holder can be adjusted about a vertical central axis to form a radius at the point of the tool.

The device is designed for attachment to bench and pedestal grinders and can also be used on plain surface grinders and on universal grinders, as will be readily understood by those versed in this art.

Its purpose is to make possible the accurate production of all cutting tools as used on bench and engine lathes, turret lathes, shapers, planers, boring mills, and any other machine which employs a cutting tool which is ground with rake, clearance, and bevel, and also any form of inside tool for lathes.

It makes possible the accurate production of all forms of thread cutting tools for bench and engine lathes such as are used for cutting V threads of any angle, the 29 degree or Acme thread, square threads, and buttress threads, internal and external.

It makes it possible to regrind or sharpen any form of V thread tool, internal or external, and any form of internal or external lathe cutting tool and to retain the respective angles of the tool so reground.

By means of graduated scales which indicate the angles of the various settings of the device, it is possible to record data for any form of cutting tool and to duplicate the tool.

It also makes possible an adjustment to permit the point of any tool to be set at the intersection of the vertical axis so that by advancing the tool point past the vertical axis and then moving the pedestal on its axis, a radius will be formed at the point of the tool. This radius can be increased or decreased by means of the adjustments provided. By these adjustments it is also possible to grind tools having a concaved form. This can be done by moving the pedestal on its axis with the tool point set behind the vertical axis and grinding the tool on the edge of the grinding wheel.

Referring now more in detail to the drawings, I will describe in detail this form or embodiment of my invention, and its adjustments for holding tools in the various positions.

A base member 11, has slidably mounted thereon a second member 12, with lock screw 13, for holding it in adjusted positions along the base member 11. Slidably mounted through said second member 12 is a third member 14, with lock screw 15. Slidably mounted on said third member 14, is a carrying member 16, also provided with a lock screw 17. Said carrying member 16 has mounted therein a pedestal base 18, interlocked therewith, with screw lock 19, whereby said pedestal base 18 can be turned and locked in various positions. A ring member 20 is shown secured to the top of the carrying member 16, by means of screws. Around the outside of this ring member 20, on top of the carrying member 16, is an adjustable ring member 21, carrying a zero mark, 22, and having a combination handle and lock screw 23, whereby said ring can be circumferentially adjusted to position the zero mark 22 in any convenient position for use. Mounted on the pedestal base 18, to turn therewith, is a second ring 24, graduated as indicated, and having a handle and lock screw 25 for securing it to the pedestal base 18, to turn therewith, whereby it is possible to turn the pedestal base to any desired or predetermined angle about its vertical axis. The upper end of said pedestal has seated thereon an internally threaded ring member 18' through which is a threaded stem 26, having a longitudinal groove or seat by means of which it is held against turning by means of a lock screw 27 through the upper end of said pedestal. By operating the ring member 18', said stem can be raised and lowered through the pedestal. The upper end of the stem is provided with a forked head 26ᵃ, in which is pivotally fitted a supporting member 28, seen in Figs. 2 and 3, and clamped therein by means of a lock screw 29, having a handle 29' and at its end screwing into the outer fork member 26ᵃ to lock the supporting member 28 therein. Secured to the outer face of said member 26ᵃ, is a graduated disk 30, graduated around its upper edge, from zero at its top in opposite directions around the upper edge, as indicated in Fig. 2. The member 28, which is thus clamped adjustable between the fork members 26ᵃ, of the stem 26, has an extension 28', seen in side elevation in Fig. 3, and this extension 28' at its top is formed into a channeled head 28ᵃ, seen in front end view in Fig. 2, and having slidably mounted therein a holding member 31, which holding member is moved therein accurately by means of a screw 32, having an operating head 33, bearing against the end of said member 28ᵃ, as will be clear from the showing. Secured to the under side of the member 28ᵃ, to project over the graduated disc 30, is a finger 34, for indicating on the graduations of said disc 30, the position of adjustment of the extension 28' about its axis at 29. The holding member 31 it will be seen, is provided on its top side with a cylindrical portion 31', open at both ends and within this is mounted a collet 35 for directly holding the tool, designated T. The tool holding end of the collet is threaded and provided with an internally threaded collar 36, and at its other end, said collet is formed to interfit with the end of the cylindrical member 31', as at 35', and is provided with a graduated head 35ᵃ for accurate circumferential adjustment. A zero mark or position is indicated at 37 on the top of the cylindrical portion 31'. The tool T, is secured in the collet 35, which has an open groove or channel 35ᶜ, by means of a plurality of set screws 38.

In Fig. 4, I have shown the collet removed and having inserted therethrough the round shank of a different kind of tool T', said collet, instead of having a square groove or channel therein for receiving and holding angular tools, has a round bore to receive the round tools which can extend therethrough, as indicated.

From the foregoing, it will be seen that the individual tool can be adjusted about its own axis, by turning the collet 35 to any desired point of adjustment, thus positioning the cutting edge of the tool to any desired position axially. It will also be understood that the position of the tool and collet can be adjusted bodily axially to intersect the vertical axis of the pedestal base, by the adjustment screw 33. That said tool can be adjusted to any angle relative to the horizontal and about the axis at 29. That it can be adjusted to any angle relative to the vertical by turning the pedestal 18. That the vertical height of said tool can be changed by operating the screw collar 18', operating on the threaded stem 26. And that the horizontal position of the tool can be changed in any direction by reason of the sliding connections between the members 11 and 12, 14 and 12, and 16 and 14.

These various adjustments will be understood by reference to Figs. 5 to 10 inclusive, wherein I have shown various adjustments and have illustrated the different positions in which a tool edge can be adjusted and held relative to a grinder G, shown as a wheel. In Figs. 5 and 6, the tool is held to sharpen the opposite sides at the desired angle. In Figs. 7 and 8, an inside cutting tool is shown held in different positions for grinding its opposite bevels or angles for accuracy. In Fig. 9, the tool is shown adjusted out of the horizontal to give another angle to the cutting end. In Fig. 10, the tool is shown intersecting the vertical axis and can be turned to provide a uniform and accurate radius to the cutting end of the tool.

These adjustments are all made according to scale and record can be made and any particular angle or cutting edge can be duplicated or reground accurately.

On Fig. 3 I have shown a finger or pointer 39, adjustable along a holding bar 40, with graduation marks 41, on the movable collet holder, thus making it possible to set the pointer to desired place for any particular job and then adjust the collet holder 31 by means of the screw 33, as may be desired. It will be understood, of course, that these graduations can be provided, as may be desired and on either side of the mechanism, as may be most convenient and that any system of graduations can be used.

While I have shown and described one practical embodiment of my invention and as it has actually been constructed and operated, I am aware that changes in the details of construction and arrangement can be made therein without departing from the spirit thereof, and I do not, therefore, limit my invention to the showing made, except as I may be limited by the hereto appended claims.

I claim:

1. A universally adjustable tool holder including in combination a collet for holding a tool and mounted to turn about its axis in its mounting, a mounting for said collet movable axially of said collet and pivotally supported to be adjusted about a horizontal axis at right angles to the axis of said collet, means supporting said mounting adapted to be raised and lowered vertically and revoluble about its vertical axis, and supporting means therefor movable in opposite directions bodily and relative to the horizontal.

2. In a device of the character described, supporting members movable horizontally upon each other in different directions and at right angles to each other, a pedestal mounted thereon and revoluble about its vertical axis, a supporting member therein and adjustable vertically to various heights, a horizontal member pivotally connected at one end to said supporting member and carried thereby, means for locking said horizontal member in different positions of adjustment about its horizontal axis, and a collet supported in said horizontal member and being rotatable and movable axially therein.

3. A tool holding instrument including a collet for holding a tool therein, a collet holder in which said collet is revoluble about its axis, a support for said collet holder, means for adjusting said collet holder horizontally in opposite directions in said support, a second support to which said first support is pivotally connected, whereby said first support can be moved vertically about a horizontal axis, means for adjusting said second support vertically, pedestal means in which said second support is held, said pedestal means being revoluble about its vertical axis, and a supporting base along which said pedestal means is movable horizontally in opposite directions.

4. In a tool holding instrument, in combination with a supporting base, a pedestal revolubly supported thereon to turn about its vertical axis and movable horizontally in opposite directions upon said base, a stem adjustable vertically in said pedestal and revoluble therewith, supporting means horizontally positioned and pivotally connected at one end to the upper end of said stem, whereby said supporting means can be moved vertically about its pivotal connection to said stem, a collet holder slidably mounted in said supporting means, means for adjusting said collet holder horizontally along said supporting means, and a collet adapted to hold a tool and rotatably mounted in said collet holder, said several adjustable parts being provided with graduation marks for determining adjustments.

5. In a tool holding device, in combination, a collet adapted to hold a tool axially therein with said tool projecting from the end thereof, a collet holder in which said collet is revolubly mounted to turn about its longitudinal axis, graduations for determining the relative revoluble adjustment of said collet in said collet holder, a collet holder support in which said collet holder is adjustable longitudinally of said support, means for adjusting said collet holder in said support, pedestal mechanism, means pivotally connecting said collet holder support to said pedestal mechanism whereby it can be adjusted about a horizontal axis, the pivot axis of said connection intersecting the vertical axis of said pedestal mechanism, and at right angles thereto, and a supporting base upon which said pedestal mechanism is adjustably held to be moved bodily horizontally in different directions.

6. A tool holding device including a tool holding collet, a collet holder in which said collet is revolubly held, a pedestal mechanism revolubly supported on a base, means pivotally connecting said collet holder to the upper end of said pedestal mechanism, the axis of said pivotal connection intersecting at right angles the vertical axis of said pedestal mechanism, the axis of said collet and collet holder intersecting the axis of said pedestal mechanism, if extended, a base structure adjustably supporting said pedestal mechanism, and means for adjusting said pedestal mechanism bodily and horizontally in various directions, and graduation marks related to said several adjustments for determining with accuracy each adjustment.

7. In a mechanism of the character referred to, in combination, a base structure, a pedestal mechanism revolubly supported thereon and adjustable horizontally in four directions, means for locking said pedestal mechanism and said base structure in the various adjusted positions, a supporting member pivotally connected with the upper end of said pedestal mechanism and having its pivot axis intersecting the vertical axis of said pedestal mechanism, if extended, a collet holder adjustably mounted in said supporting member, means for moving and holding said collet holder in adjusted positions along said supporting member, and a collet for holding tools revolubly supported in said collet holder.

8. In a tool holding mechanism, a collet adapted to hold a tool axially therein, a collet holder in which said collet is revolubly held to be turned about its longitudinal axis, graduation means for determining the adjustment of the collet relative to the collet holder, a supporting member in which said collet holder is adjustably supported, screw means for adjusting said collet holder lengthwise of said supporting member, a pedestal mechanism revolubly supported and having a part adjustable vertically, said supporting member being pivotally connected to said adjustable part of said pedestal mechanism, means for locking said supporting member in different positions of adjustment about said pivotal axis, a base structure upon which said pedestal mechanism is revolubly supported, said base structure being adjustable for moving said pedestal mechanism bodily horizontally in various directions, and means for locking said parts in adjusted positions.

9. In a tool holding mechanism, a base structure, a pedestal mechanism revolubly supported on said base structure, a zero ring adjustable circumferentially on said base, a graduated ring adjustably secured to said pedestal mechanism and adjacent said zero ring, means for locking said zero ring in adjusted position, means for locking said graduated ring in adjusted position to turn with said pedestal mechanism, whereby the adjustment of said pedestal mechanism about its vertical axis can be conveniently determined, and tool holding mechanism adjustably connected with the upper end of said pedestal mechanism, said mechanism being adapted to adjust a tool held therein axially of said tool and bodily about horizontal and vertical axes.

10. In a mechanism of the character referred to, a supporting base, a pedestal mechanism revolubly supported thereon, said supporting base having horizontal adjustment in four directions for said pedestal mechanism, tool holding mechanism pivotally supported at the upper end of said pedestal mechanism and adjustable about the vertical axis of said pedestal mechanism and about a horizontal axis, means for locking said pedestal mechanism in adjusted positions, said tool holding mechanism having a part for directly holding a tool and adjustable to extend a tool held thereby axially across the vertical axis of said pedestal mechanism, if extended vertically.

Signed at Los Angeles, Los Angeles County, California, this 10th day of May, 1929.

EDWARD P. McMURTRY.